May 12, 1931. H. W. PLEISTER ET AL 1,804,807
DRIVE RING
Filed Aug. 1, 1928 3 Sheets-Sheet 1
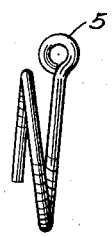
Fig. 1
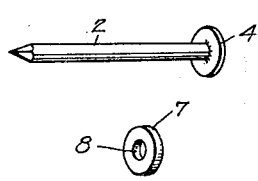
Fig. 2
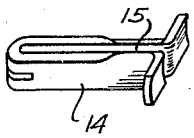
Fig. 5
Fig. 3
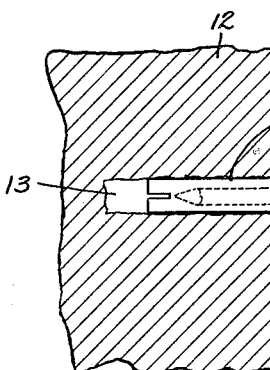
Fig. 4
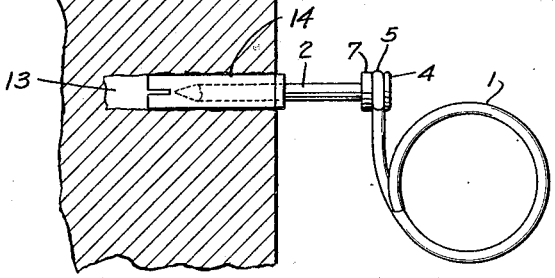
Fig. 6
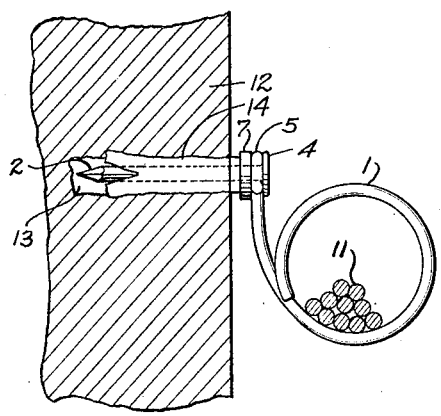
Fig. 7
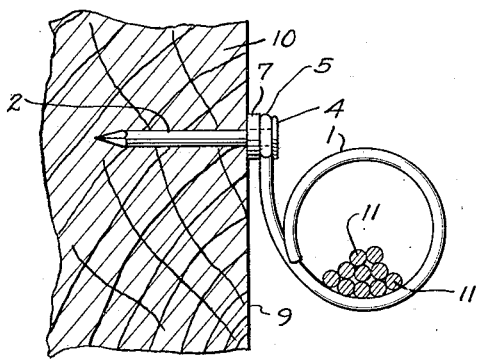
Fig. 8
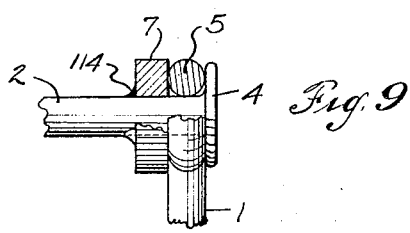
Fig. 9
INVENTORS
Henry W. Pleister
John Karitzky
BY
Alanson Johnson
ATTORNEYS.

May 12, 1931.  H. W. PLEISTER ET AL  1,804,807
DRIVE RING
Filed Aug. 1, 1928   3 Sheets-Sheet 2

INVENTORS
Henry W. Pleister
John Kautzky
BY
Clarke Johnson
ATTORNEYS.

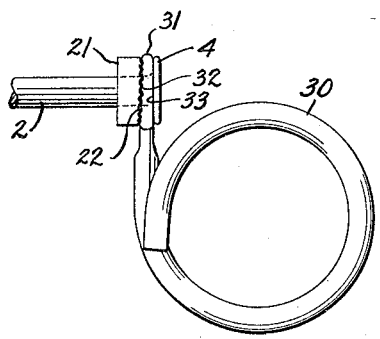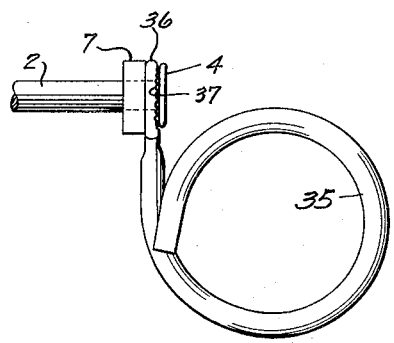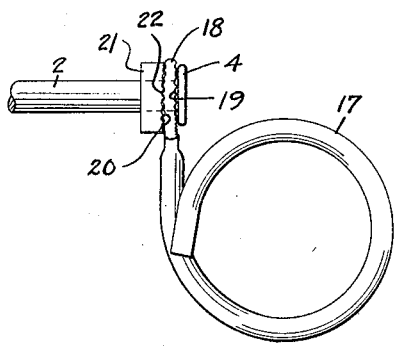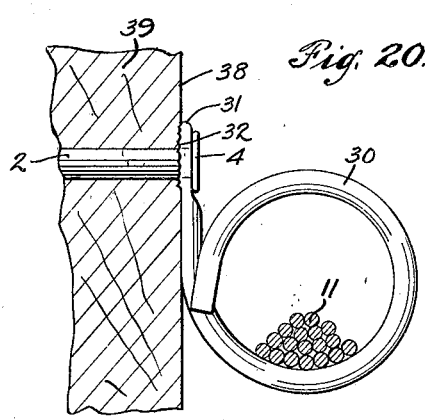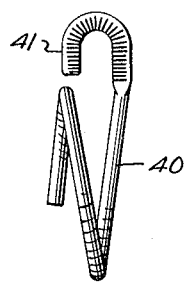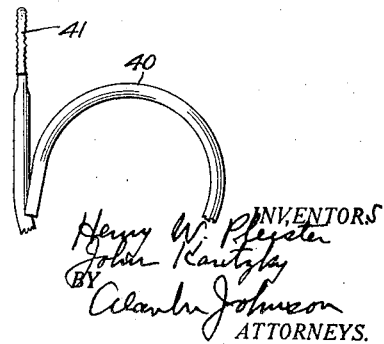

Patented May 12, 1931

1,804,807

UNITED STATES PATENT OFFICE

HENRY W. PLEISTER, OF WESTFIELD, AND JOHN KARITZKY, OF GARWOOD, NEW JERSEY, ASSIGNORS TO HENRY B. NEWHALL CORPORATION, OF GARWOOD, NEW JERSEY, A CORPORATION OF NEW JERSEY

DRIVE RING

Application filed August 1, 1928. Serial No. 296,743.

Our invention relates to drive rings, used more particularly in the telephone and telegraph art, to support wires, as for example, drop or bridle wires.

Our invention further relates to a drive ring formed of a plurality of members securely held together to form, for all practical purposes, an integral drive ring, which is sold as a separate article of manufacture.

Our invention further relates to a drive ring having a shank, a ring, and a member mounted on the shank to hold the ring and shank together forming a single unitary article of manufacture.

Our invention further relates to certain combinations, sub-combinations, articles of manufacture, and details of construction, all of which will be more fully hereinafter described and pointed out in the claims.

In the accompanying drawings, the same reference numerals refer to similar parts in the several figures.

Figure 1 is a perspective view of the ring portion of our drive ring;

Fig. 2 is a perspective view of the shank of our drive ring;

Fig. 3 is a perspective view of a separate member, as for example a drive collar, which we employ to secure the ring and shank together;

Fig. 4 is a side elevation of our complete drive ring;

Fig. 5 is a perspective view of a nail shield which we may employ with our drive ring in certain locations;

Fig. 6 is a vertical section through a support showing the manner of using our drive ring with the nail shield of Fig. 5, the shank of the drive ring being located within the shield but not driven home;

Fig. 7 is a vertical section, similar to Fig. 6, with the shank driven home and expanding the shield;

Fig. 8 is a vertical section showing the shank of our drive ring driven directly into a support;

Fig. 9 is an enlarged fragmentary view of a modification in which the collar may, in addition to friction, be secured on the shank by a spot weld;

Fig. 12 is a detail perspective view of a modified form of collar;

Fig. 13 is a perspective of a modified form of shank;

Fig. 14 is a front elevation of a modified form of ring;

Fig. 15 is a side elevation of the complete drive ring shown in this modification;

Fig. 16 is a fragmentary side elevation of a portion of the ring shown in Fig. 15;

Fig. 17 is a side elevation of another modification;

Fig. 18 is a side elevation of another modification;

Fig. 19 is a side elevation of still another modification;

Fig. 20 is a side elevation of another modification;

Fig. 21 is a front elevation of a modification in which the ring is provided with a hook instead of an eye; and Fig. 22 is a side elevation, partly broken away, of the form of ring shown in Fig. 21.

Figure 10:
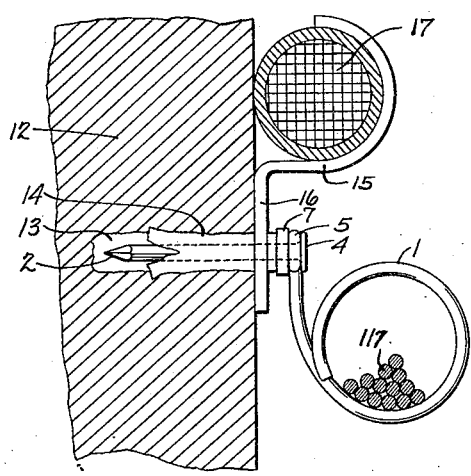
Fig. 10 is a vertical section through a support showing our drive ring used in combination with a cable clamp.

By our invention we form a drive ring 1 of a plurality of members immovably secured together so as to make a single unitary article of manufacture.

Different portions of a drive ring are subjected to entirely different strains and stresses. For example, the shank must be formed of metal sufficiently hard to permit it to be driven by a hammer or otherwise, into any suitable support, as wood, plaster-board, asbestos-block, or other relatively soft material; or, if the support is masonry, concrete, brick, stone, terra-cotta or similar material, then the shank of the bridle ring must be sufficiently strong to expand a nail shield mounted in a hole previously drilled or otherwise formed in such support.

We provide the shank 2 with a head 4 and the ring with a closed eye 5. The shank 2 is then placed through the closed eye until the head 4 is in contact with the closed eye. We secure the closed eye 5 against the head by an additional member, as for example, the collar 7, (Fig. 3) having a bore 8 which will insure a tight friction grip between the shank 2 and the collar as the shank is driven into it. By driving down this collar 7 against the closed eye 5, it will be apparent from Fig. 4, that the closed eye will be securely and immovably clamped between the head 4 of the shank and the collar 7, forming our complete drive ring as shown in Fig. 4.

After the different members of our drive ring have been assembled, as previously described, the complete drive ring may be galvanized, if desired. The shank 2 of our drive ring may be a wire nail of the required strength, size and hardness.

In use the shank 2 of our drive ring may be driven directly into a support of wood 10, or any other support, such as plaster-board, asbestos-block or other relatively soft material by blows of a hammer or other implement upon the head 4 of the shank. The drop or bridle wires 11, 11 can be readily positioned in the ring 3, but cannot readily be withdrawn without proper manipulation.

When the support 12 is of stone, masonry, terra-cotta, brick, concrete or similar material into which the shank 2 cannot be driven, a hole 13 is drilled or otherwise formed in said support, in which is located a nail expansion shield 14, (Fig. 5). The shank 2 is secured to the wall 12 by positioning the shank within the axial bore 15 of the nail shield 14 (Fig. 6), and then driving it home as shown in Fig. 7, where the shield is shown expanded.

In some cases we may secure the collar 7 upon the shank 2 by spot welding 114. This may be in addition to the friction grip of the collar on the shank, or if the hole 8 is of such a diameter that no friction grip is obtained by positioning the shank 2 within the collar, then the spot weld will hold the collar in position so as to firmly grip the closed eye 5 between the head 4 of the shank 2 and the collar 7, preventing relative rotation or movement of the ring and shank with relation to each other.

Figure 11:
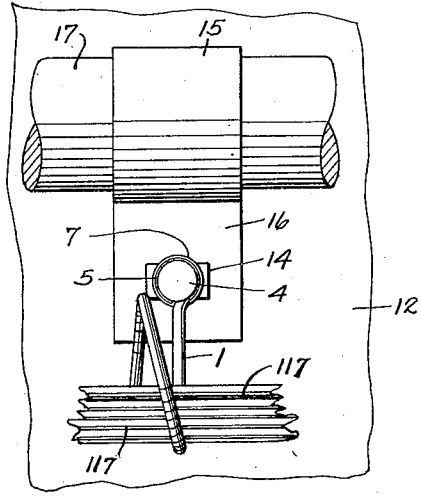
Fig. 11 is a front elevation of the structure shown in Fig. 10.

Our drive ring may be employed with a cable clamp 15, shown in Figs. 10 and 11.

In these figures a cable clamp 15 is provided with the ordinary hole in the base 16 for the passage of a securing member, which in this case is the shank 2 of our drive ring, which is shown cooperating with a nail shield 14. In this form of our invention our drive ring not only supports the drop or bridle wires 11—11, but also the cable clamp 15, which in turn supports the cable 117.

In some cases we may provide locking surfaces on the ring and upon either, or both, the shank and collar, or other cooperating member. In Figs. 12 to 16 we have shown such a modification of our invention in which the ring 17 is provided with a closed eye 18 by bending the metal of the ring back upon itself and preferably flattening it and providing it with locking surfaces 19 on one side, and locking surfaces 20 on the other; but, of course, it is to be understood that one set of these locking surfaces may be omitted. When the ring 17 is provided only with the locking surfaces 20, we provide a collar 21 with cooperating locking surfaces 22 to cooperate with the locking surfaces 20 carried by the ring 17. In this case there need be no cooperating locking surfaces upon the shank 23. To further insure the rigidity of the ring upon the shank we may provide the head 24 of the shank 23 with cooperating locking surfaces 25 so that when the ring 17 is forced onto the shank 23 its locking surfaces 19 will cooperate with the locking surfaces 25 carried on the under surface of the head 24. By then forcing down the collar 21, its locking surfaces 22 will cooperate with the locking surfaces 20 on the other side of the closed eye 18. These single or double locking surfaces, of course, may be omitted, as shown in the first form. The collar 21 may, in addition to its friction upon the shank 23, be further held by a spot weld such as 114 shown in Fig. 9 in connection with the first form.

In some cases we may employ a shank 2 having a head 4 and a ring 30 having a closed eye or hook 31 with locking surfaces or corrugations 32 on one side and a plain surface 33 on the other side, Fig. 17. The locking surfaces or corrugations 32, cooperate with the corrugations 22 on the collar 21, while the plain surface 33 of the closed eye or hook 31 contacts with the under surface of the head 4 of the shank 2.

In Fig. 18 we have shown a modification in which we employ a shank 2 having a plain head 4, and a ring 35 having a closed eye or hook 36 provided with corrugations or locking surfaces 37 on one side to engage with the head 4. The locking collar 7 is provided with a smooth surface to engage with the smooth surface of the eye or hook 36.

Figure 12:
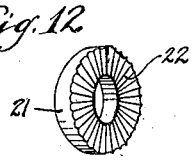
Figs. 12 to 16 illustrate a modification.
Figure 13:
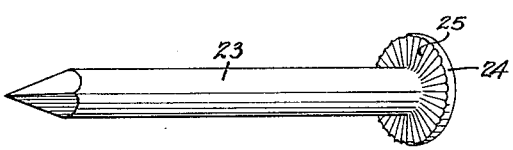
Figure 14:
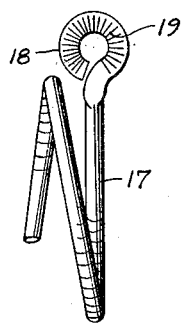
Figure 16:
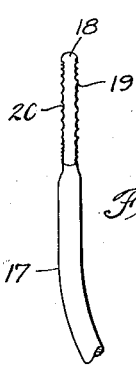
Figure 15:
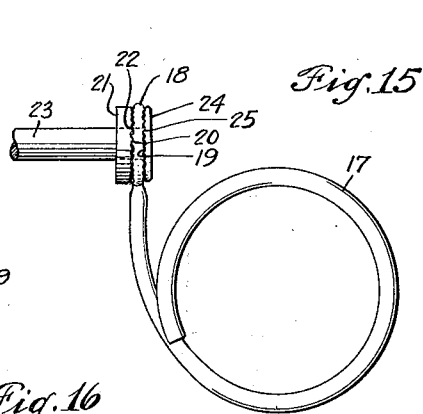

In Fig. 19 we illustrate a modification in which the ring 17 having the closed eye 18 provided with corrugations or locking surfaces 19 and 20, Fig. 16, cooperates with the collar 21 having the corrugations or locking surfaces 22, Fig. 12, and also cooperates with the shank 2 having a plain head 4, Fig. 2.

In some cases we may omit the collar entirely, Fig. 20. In this modification the shank 2 and head 4 cooperate with the ring 30, the corrugations 32 of the ring engage with, and bite into, the surface 38 of the wall 39.

Instead of employing a closed eye on the ring we may employ a ring 40 with a hook 41 (Figs. 21 and 22). It is to be understood that wherever we have illustrated a closed eye, a hook may be used instead.

Having thus described this invention in connection with illustrative embodiments thereof, to the details of which we do not desire to be limited, what is claimed as new and what is desired to secure by Letters Patent is set forth in the appended claims.

What we claim is:—

1. A new article of manufacture comprising a rigid non-separable drive ring formed of a separate ring having an eye, a separate shank of hard metal having a driving head on one side of the eye and adapted to protect the eye from blows of a hammer or similar tool, and a collar mounted on the shank on the other side of the eye, and adapted to secure the shank and eye together and form a strong joint between the ring and shank.

2. A new article of manufacture comprising a rigid non-separable drive ring formed of a separate ring and a separate shank having an enlarged driving head, and means to immovably secure them together without subjecting the shank to shearing strains when in use.

HENRY W. PLEISTER.
JOHN KARITZKY.